(12) United States Patent
Agrawal et al.

(10) Patent No.: US 12,058,474 B2
(45) Date of Patent: Aug. 6, 2024

(54) RECORDED CONTENT MANAGED FOR RESTRICTED SCREEN RECORDING

(71) Applicant: Motorola Mobility LLC, Chicago, IL (US)

(72) Inventors: Amit Kumar Agrawal, Bangalore (IN); Gautham Prabhakar Natakala, Bangalore (IN); Shaung Wu, Shenzhen (CN)

(73) Assignee: Motorola Mobility LLC, Chicago, IL (US)

( * ) Notice: Subject to any disclaimer, the term of this patent is extended or adjusted under 35 U.S.C. 154(b) by 0 days.

(21) Appl. No.: 17/184,912

(22) Filed: Feb. 25, 2021

(65) Prior Publication Data

US 2022/0256111 A1     Aug. 11, 2022

(30) Foreign Application Priority Data

Feb. 9, 2021   (CN) .......................... 202110174655.0

(51) Int. Cl.
| | |
|---|---|
| *H04N 5/91* | (2006.01) |
| *G06F 21/84* | (2013.01) |
| *H04N 5/775* | (2006.01) |
| *H04N 5/782* | (2006.01) |

(Continued)

(52) U.S. Cl.
CPC ............. *H04N 5/913* (2013.01); *G06F 21/84* (2013.01); *H04N 5/775* (2013.01); *H04N 5/78206* (2013.01); *H04N 2005/91307* (2013.01)

(58) Field of Classification Search
USPC ................................................ 386/248, 278
See application file for complete search history.

(56) References Cited

U.S. PATENT DOCUMENTS

| | | | |
|---|---|---|---|
| 8,191,152 B1 | 5/2012 | Barker et al. | |
| 8,887,306 B1 * | 11/2014 | Palacio .............. | H04N 21/8455 726/28 |
| 9,424,668 B1 * | 8/2016 | Petrou ................ | G06K 9/00442 |

(Continued)

OTHER PUBLICATIONS

U.S. Appl. No. 17/154,677, "Supplemental Notice of Allowability", U.S. Appl. No. 17/154,677, filed Oct. 13, 2022, 3 pages.

(Continued)

*Primary Examiner* — Nigar Chowdhury
(74) *Attorney, Agent, or Firm* — FIG. 1 Patents

(57) ABSTRACT

In aspects of recorded content managed for restricted screen recording, a wireless device displays digital image content, and a screen recording session captures the digital image content and audio data. The wireless device implements a content control module that determines a device application restricts the screen recording session from capturing the media content. The content control module can then pause the screen recording session for a time duration that the device application restricts the screen recording session, and then resume the screen recording session after a determination that the screen recording session is no longer being restricted. As an alternative to pausing the screen recording session, the content control module can add a start delimiter to indicate a beginning section of the screen recording session being restricted by the device application, and add an end delimiter to indicate an end section of the screen recording session being restricted.

20 Claims, 9 Drawing Sheets

(51) Int. Cl.
*H04N 5/913* (2006.01)
*H04N 5/77* (2006.01)

(56) References Cited

U.S. PATENT DOCUMENTS

| | | | |
|---|---|---|---|
| 9,750,420 B1* | 9/2017 | Agrawal | G06T 7/73 |
| 9,936,066 B1* | 4/2018 | Mammen | G10L 15/26 |
| 11,019,106 B1* | 5/2021 | Harvell | G06F 9/45558 |
| 11,323,653 B1* | 5/2022 | Voss | H04N 23/633 |
| 11,509,857 B2 | 11/2022 | Agrawal et al. | |
| 11,930,240 B2 | 3/2024 | Agrawal | |
| 11,947,702 B2 | 4/2024 | Agrawal et al. | |
| 11,979,682 B2 | 5/2024 | Agrawal et al. | |
| 2008/0068343 A1 | 3/2008 | Hoshino et al. | |
| 2008/0155538 A1* | 6/2008 | Pappas | G09B 7/04 718/100 |
| 2008/0194333 A1 | 8/2008 | Zalewski | |
| 2008/0309762 A1 | 12/2008 | Howard et al. | |
| 2009/0317063 A1* | 12/2009 | Adachihara | G11B 27/10 386/239 |
| 2013/0016115 A1* | 1/2013 | Minert | H04N 7/167 345/589 |
| 2014/0108943 A1* | 4/2014 | Lee | H04W 4/18 715/738 |
| 2014/0109063 A1* | 4/2014 | Schissel | G06F 11/0712 717/127 |
| 2014/0188802 A1* | 7/2014 | Branton | G06F 9/543 707/634 |
| 2014/0250227 A1* | 9/2014 | Slovacek | H04M 3/5191 709/224 |
| 2014/0359493 A1 | 12/2014 | Hong et al. | |
| 2014/0375750 A1* | 12/2014 | Yoshida | H04N 7/141 348/14.07 |
| 2015/0242104 A1* | 8/2015 | Stokman | G11B 27/031 715/723 |
| 2015/0281436 A1* | 10/2015 | Kumar | H04M 3/5166 379/68 |
| 2015/0281445 A1* | 10/2015 | Kumar | H04M 3/5175 379/88.01 |
| 2015/0367238 A1* | 12/2015 | Perrin | A63F 13/49 463/29 |
| 2015/0378577 A1* | 12/2015 | Lum | G06F 3/048 715/720 |
| 2016/0006797 A1* | 1/2016 | Aoki | H04L 67/42 709/203 |
| 2016/0072861 A1* | 3/2016 | Woolsey | H04W 4/14 455/414.1 |
| 2016/0205340 A1* | 7/2016 | Jang | G11B 27/031 348/14.02 |
| 2016/0277808 A1* | 9/2016 | Yu | H04N 21/41407 |
| 2016/0306514 A1* | 10/2016 | McKeithan, II | G06F 21/10 |
| 2016/0360256 A1* | 12/2016 | Van Os | A63F 13/00 |
| 2017/0046279 A1* | 2/2017 | Song | G06F 21/10 |
| 2017/0048380 A1* | 2/2017 | Ito | H04N 5/2257 |
| 2017/0068829 A1 | 3/2017 | Shaw et al. | |
| 2017/0104893 A1 | 4/2017 | Hardy et al. | |
| 2017/0164146 A1* | 6/2017 | Coppert | H04W 4/021 |
| 2017/0238026 A1* | 8/2017 | Agrawal | H04N 21/25883 725/14 |
| 2017/0240440 A1* | 8/2017 | Shao | B03C 1/286 |
| 2017/0243013 A1* | 8/2017 | Herlocher | G06Q 20/3223 |
| 2017/0262136 A1* | 9/2017 | Raghavan | G06F 3/0481 |
| 2017/0269809 A1* | 9/2017 | Qian | G11B 27/005 |
| 2017/0269895 A1 | 9/2017 | Gates et al. | |
| 2017/0269976 A1* | 9/2017 | Venkataraman | G06F 9/54 |
| 2017/0289267 A1* | 10/2017 | Eschbach | H04L 67/02 |
| 2018/0046341 A1* | 2/2018 | Lee | G06F 3/04842 |
| 2018/0130496 A1* | 5/2018 | Mahapatra | G11B 27/28 |
| 2018/0315428 A1* | 11/2018 | Johnson | G16H 10/60 |
| 2019/0037173 A1* | 1/2019 | Lee | H04W 4/18 |
| 2019/0073490 A1 | 3/2019 | Agrawal et al. | |
| 2019/0306310 A1* | 10/2019 | Saito | H04M 3/42221 |
| 2019/0369952 A1* | 12/2019 | Little | G06F 3/04817 |
| 2020/0050983 A1* | 2/2020 | Balasubramanian | G06F 11/3423 |
| 2020/0143821 A1 | 5/2020 | Johnson, Jr. et al. | |
| 2020/0219023 A1* | 7/2020 | Duchastel | G06Q 10/0635 |
| 2021/0012026 A1 | 1/2021 | Taylor et al. | |
| 2021/0012036 A1* | 1/2021 | Franzo | G06F 21/6218 |
| 2021/0064880 A1* | 3/2021 | Zhang | G06T 7/73 |
| 2021/0069550 A1* | 3/2021 | Clark | A63B 71/0622 |
| 2021/0133334 A1* | 5/2021 | Ji | H04W 12/12 |
| 2021/0133459 A1 | 5/2021 | Wang et al. | |
| 2021/0192223 A1* | 6/2021 | Williams | A63F 13/79 |
| 2021/0200501 A1* | 7/2021 | Stankoulov | G06F 3/0488 |
| 2021/0243233 A1 | 8/2021 | Singh et al. | |
| 2021/0243418 A1 | 8/2021 | Ojala | |
| 2021/0263968 A1* | 8/2021 | Zade | G06F 16/9038 |
| 2021/0353209 A1* | 11/2021 | Gossens | G16H 40/67 |
| 2022/0043938 A1 | 2/2022 | Kochura et al. | |
| 2022/0138345 A1 | 5/2022 | Krishnan et al. | |
| 2022/0150571 A1 | 5/2022 | Agrawa | |
| 2022/0161145 A1* | 5/2022 | Hardee | G11B 27/34 |
| 2022/0206645 A1* | 6/2022 | Zadina | G06F 3/167 |
| 2022/0207175 A1 | 6/2022 | Agrawal et al. | |
| 2022/0210365 A1 | 6/2022 | Agrawal et al. | |
| 2023/0069486 A1 | 3/2023 | Agrawal et al. | |
| 2023/0239426 A1 | 7/2023 | Agrawal et al. | |
| 2023/0239427 A1 | 7/2023 | Agrawal et al. | |

OTHER PUBLICATIONS

U.S. Appl. No. 17/095,363, "Non-Final Office Action", U.S. Appl. No. 17/095,363, filed Jan. 20, 2023, 9 pages.
U.S. Appl. No. 17/154,628, "Final Office Action", U.S. Appl. No. 17/154,628, filed Jan. 26, 2023, 22 pages.
U.S. Appl. No. 17/985,549, "Non-Final Office Action", U.S. Appl. No. 17/985,549, filed Apr. 18, 2023, 11 pages.
U.S. Appl. No. 17/985,549, "Restriction Requirement", U.S. Appl. No. 17/985,549, filed Mar. 10, 2023, 6 pages.
U.S. Appl. No. 17/095,363, "Non-Final Office Action", U.S. Appl. No. 17/095,363, filed Jul. 11, 2022, 14 pages.
U.S. Appl. No. 17/154,628, "Non-Final Office Action", U.S. Appl. No. 17/154,628, filed Aug. 5, 2022, 19 pages.
U.S. Appl. No. 17/154,677, "Non-Final Office Action", U.S. Appl. No. 17/154,677, filed Jul. 19, 2022, 11 pages.
U.S. Appl. No. 17/154,677, "Notice of Allowance", U.S. Appl. No. 17/154,677, filed Oct. 5, 2022, 5 pages.
U.S. Appl. No. 17/095,363, "Non-Final Office Action", U.S. Appl. No. 17/095,363, filed Oct. 25, 2023, 9 pages.
U.S. Appl. No. 17/095,363, "Notice of Allowance", U.S. Appl. No. 17/095,363, filed Jan. 8, 2024, 7 pages.
U.S. Appl. No. 17/154,628, "Corrected Notice of Allowability", U.S. Appl. No. 17/154,628, filed Nov. 3, 2023, 3 pages.
U.S. Appl. No. 17/154,628, "Corrected Notice of Allowability", U.S. Appl. No. 17/154,628, filed Dec. 12, 2023, 2 pages.
U.S. Appl. No. 18/190,227, "Final Office Action", U.S. Appl. No. 18/190,227, filed Dec. 28, 2023, 14 pages.
U.S. Appl. No. 18/190,263, "Notice of Allowance", U.S. Appl. No. 18/190,263, filed Jan. 5, 2024, 5 pages.
U.S. Appl. No. 17/095,363, "Advisory Action", U.S. Appl. No. 17/095,363, filed Sep. 13, 2023, 3 pages.
U.S. Appl. No. 17/095,363, "Final Office Action", U.S. Appl. No. 17/095,363, filed Jun. 22, 2023, 10 pages.
U.S. Appl. No. 17/154,628, "Notice of Allowance", U.S. Appl. No. 17/154,628, filed Oct. 4, 2023, 8 pages.
U.S. Appl. No. 17/985,549, "Final Office Action", U.S. Appl. No. 17/985,549, filed Sep. 6, 2023, 12 pages.
U.S. Appl. No. 18/190,227, "Non-Final Office Action", U.S. Appl. No. 18/190,227, filed Jul. 17, 2023, 12 pages.
U.S. Appl. No. 18/190,263, "Non-Final Office Action", U.S. Appl. No. 18/190,263, filed Jul. 17, 2023, 12 pages.
U.S. Appl. No. 17/095,363, "Notice of Allowability", U.S. Appl. No. 17/095,363, filed Jan. 19, 2024, 4 pages.
U.S. Appl. No. 17/985,549, "Non-Final Office Action", U.S. Appl. No. 17/985,549, filed Apr. 9, 2024, 13 pages.

(56) References Cited

OTHER PUBLICATIONS

U.S. Appl. No. 18/190,263, "Corrected Notice of Allowability",
U.S. Appl. No. 18/190,263, filed Jan. 19, 2024, 2 pages.
U.S. Appl. No. 18/190,263, "Supplemental Notice of Allowability",
U.S. Appl. No. 18/190,263, filed Apr. 4, 2024, 2 pages.

* cited by examiner

RECORDED CONTENT MANAGED FOR RESTRICTED SCREEN RECORDING

RELATED APPLICATION

This application claims the priority benefit of China Patent Application for Invention Serial No. 202110174655.0 filed Feb. 9, 2021 entitled "Recorded Content Managed for Restricted Screen Recording," the disclosure of which is incorporated by reference herein in its entirety.

BACKGROUND

Devices such as smart devices, mobile devices (e.g., cellular phones, tablet devices, smartphones), consumer electronics, and the like have become increasingly commonplace to many device users. For example, one person may have a laptop computer, a desktop computer, a tablet device, a mobile phone, and so forth. Furthermore, these different devices may have different operating systems and can run numerous different types of applications. While the variety of devices and applications provides users with a large number of options, it can also be difficult for users to learn how to use the various different devices and applications. Accordingly, a user who is wanting to learn an aspect of device operation or function, or learn an application feature, such as for a personal or business task, for entertainment, or to conquer a gaming level, may seek to find a recorded example via any number of the available social media platforms. Often, other users who are proficient with a particular device operation or software application feature will perform the device operation, or run through the application feature, while screen recording their own device, thus capturing an instruction tutorial with audio and/or video, which can then be shared on any number of the social media platforms for access by others.

A screen recording feature may be included as a device function in many of the different types of devices, and can be initiated by a user who is operating a device to capture a sequence of device inputs and operations, application features, and resulting displayed outputs. A user may initiate a screen recording session on a device in any number of various scenarios, such as a prolific gamer recording his or her game play for sharing with fan followers, or as noted above, to create an instruction tutorial for others. Alternatively, a person who reviews and evaluates new consumer devices may initiate a screen recording session to capture and share new device functionality for an online audience. Similarly, a technical and/or quality assurance reviewer may initiate a screen recording session to capture and report a device operation function or feature.

The screen recording feature obviates the need for assistance from another person holding a separate device and recording a video of the user who is operating his or her own device to demonstrate a sequence of device inputs and operations, application features, and resulting displayed outputs. The screen recording feature also provides for convenient content generation and sharing from the single device itself. While the screen recording feature offers several benefits to the user of a device, the screen recording feature is not without problems that may be encountered, particularly while a screen recording session is initiated and recording on a device. For example, there are several types of device applications that will restrict the screen recording feature on a device if an application is the foreground application executing on the device. These types of device applications can restrict the screen recording feature on the device to prevent disclosing content associated with an application, such as to protect against disclosing user privacy information, as well as for enforcing digital rights management, content security, copyright concerns, and/or for other business reasons. Notably, some jurisdictions do not permit recording audio and/or visual data while on an active telephone or video conference call without receiving consent from all of the participants in the call.

When a device application executes on a device as the foreground application and restricts recording during a screen recording session, the screen recording session will generally continue, but only record blank video data without audio or visual data during the time duration that the device application restricts the screen recording session. The recorded blank video data without audio or visual data can result in a long, blank gap in the screen recording session, which when uploaded for sharing and viewing, results in a poor user experience. A restriction of the screen recording feature also unnecessarily utilizes audio and video codec resources on the device that processes the audio and video only to then have it recorded as blank video data without audio or visual data.

BRIEF DESCRIPTION OF THE DRAWINGS

Implementations of the techniques for recorded content managed for restricted screen recording are described with reference to the following Figures. The same numbers may be used throughout to reference like features and components shown in the Figures.

DETAILED DESCRIPTION

Figure 1:
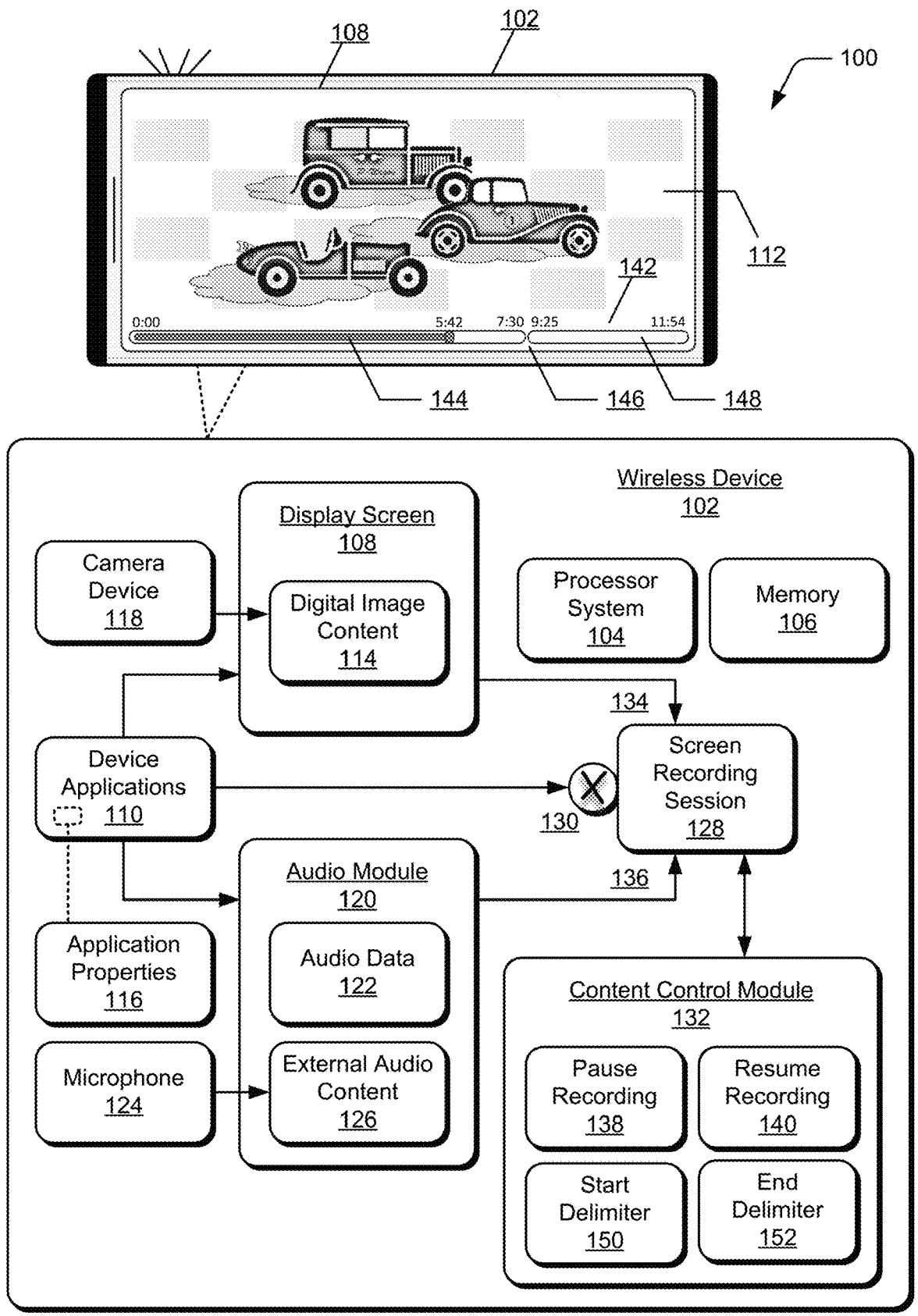
FIG. 1 illustrates an example of techniques for recorded content managed for restricted screen recording using a wireless device in accordance with one or more implementations as described herein.

Implementations of recorded content managed for restricted screen recording are described, and provide techniques that can be implemented by any type of computing devices, such as smart devices, mobile devices (e.g., cellular phones, tablet devices, smartphones), consumer electronics, and the like. Generally, a screen recording feature may be included as a device function in a wireless device, and can be initiated by a user who is operating the device to capture a sequence of device inputs and operations, application features, and resulting displayed outputs. A user may initiate a screen recording session on the wireless device, thus capturing an instruction tutorial with audio and/or video, which can then be shared on any number of social media platforms for access by others. For example, a user who is proficient with particular device operations or software application features will perform the device operations, or run through the application features, while screen recording their own device. The screen recording feature provides for convenient content generation and sharing from the single device itself.

However, given the nature and general purpose of a wireless device (e.g., a smartphone for communication and application interface), it is likely that a user may knowingly or unknowingly open a device application that does not permit recording, and the application will restrict recording media content during a screen recording session. Alternatively or in addition, the user of the device may initiate to receive media content and/or other types of data from a content provider, and the media content is rendered as audio via a speaker of the device and/or displayed for viewing on the display screen of the device. For example, a user may utilize a web browsing application to browse for media content to playback while a screen recording session is initiated on the wireless device. However, playback of the media content may be restricted due to enforcement of digital rights management, for copyright issues, to protect from disclosing personal content or information associated with the user of the device, and/or for any number of other reasons.

Although the web browsing application on the device may not be designated as a device application that restricts the recording of the media content during a screen recording session, the content provider of the media content may include data control and/or data restrictions along with the media content to restrict any recording of the media content at the device. As a result, the screen recording session will generally continue, but only as blank video data without audio or visual content during the time duration that the device application or content provider restricts the screen recording session. When a device application executes on the wireless device as the foreground application and restricts recording during a screen recording session, the recorded blank video data without audio or visual content can result in a long, blank gap in the screen recording session, which when uploaded for sharing and viewing, results in a poor user experience.

The techniques for recorded content managed for restricted screen recording provide a feature to pause a screen recording session for the time duration during which the recording is restricted by a device application. Alternatively, markers are added as start and end delimiters to the recording to ease user navigation when viewing a screen recording that includes the recorded blank video data without audio or visual content. Notably, the techniques for recorded content managed for restricted screen recording, as described herein, do not circumvent the ability of device applications to restrict the screen recording feature on a device, but rather provide helpful indications for a viewer of a recording so that the discontinuity of a blank or black screen during playback of the recording is not perceived as a "glitch" or other playback error.

In aspects, a wireless device has a display screen to display digital image content, and includes an audio module to process audio data. As described herein, the terms "digital image content" and "media content" include any type of video, subtitles, graphics, or other displayable media content, and can also include audio data. Notably, the term "video" as used herein also encompasses any type of video, subtitles, graphics, or other displayable media content, and can also include audio data. A screen recording session can be initiated to capture the digital image content and/or the audio data. In implementations, the wireless device may include a microphone to detect external audio content that is processed as the audio data and/or may include a camera device to capture the digital image content that is displayed on the display screen.

The wireless device implements a content control module that can determine the digital image content or the audio data is associated with a device application or content provider that restricts the screen recording session. The content control module can also determine that the device application is executing on the wireless device as a foreground application, and that the device application restricts the screen recording session from capturing the digital image content and/or the audio data. In implementations, the content control module can determine that the device application or content provider restricts the screen recording based on the wireless device processing empty video data or empty audio data during the screen recording session.

The content control module can then pause the screen recording session for a time duration that the device application or content provider restricts the screen recording session, such as to pause the screen recording session from capturing internal audio or the external audio content during the screen recording session, or to pause the screen recording session from capturing the digital image content during the screen recording session. Subsequently, the content control module can determine that the device application is executing on the wireless device as a background application, and then resume the screen recording session after a determination that the screen recording session is no longer being restricted.

As an alternative to pausing the screen recording session, the content control module can determine that the device application or content provider restricts the screen recording session from capturing the media content on the wireless device, and add a start delimiter to indicate a beginning section of the screen recording session being restricted by the device application or the content provider, and prevented from recording the media content. The content control module can also add an end delimiter to indicate an end section of the screen recording session being restricted, such as when the device application reverts to executing on the wireless device as a background application, or is closed. The screen recording session is recorded as blank video data without audio or visual content during the time duration that the device application or content provider restricts the screen recording session marked by the start delimiter to the end delimiter.

While features and concepts of recorded content managed for restricted screen recording can be implemented in any number of different devices, systems, environments, and/or configurations, implementations of recorded content managed for restricted screen recording are described in the context of the following example devices, systems, and methods.

FIG. 1 illustrates an example 100 of techniques for recorded content managed for restricted screen recording, such as implemented with a wireless device 102. In this example 100, the wireless device 102 may be any type of a mobile phone, flip phone, computing device, tablet device, and/or any other type of device. Generally, the wireless device 102 may be any type of an electronic, computing, and/or communication device implemented with various components, such as a processor system 104 and memory 106, as well as any number and combination of different components as further described with reference to the example device shown in FIG. 9. For example, the wireless device 102 can include a power source to power the device, such as a rechargeable battery and/or any other type of active or passive power source that may be implemented in an electronic, computing, and/or communication device.

The wireless device 102 includes a display screen 108, which may be a flat display screen or a curved display that wraps around, or partially wraps, the vertical sides of the wireless device. The wireless device 102 also includes device applications 110, such as a text application, email application, video service application, cellular communication application, music application, gaming application, web browser, file explorer application, and/or any other of the many possible types of device applications. The device applications 110 as referred to herein also encompasses any content provider that communicates and provides content to the wireless device, such as via a device application executing on the device. For example, a web browser application executing on the wireless device 102 may receive and surface various different types of media content and/or data from different web-based services, some of which may restrict recording of the media content and/or data during a screen recording session.

Many device applications 110 have an associated user interface that is generated and displayed for user interaction and viewing, such as the user interface 112 of a gaming application (e.g., an auto racing game) shown on the display screen 108 of the wireless device in this example. The display screen 108 of the wireless device 102 can display a user interface that is associated with any of the device applications 110. Generally, a user interface, or any other type of video, image, graphics, and the like is digital image content 114 that is displayable on the display screen 108 of the wireless device. As described herein, the terms "digital image content" and "media content" include any type of video, subtitles, graphics, or other displayable media content, and can also include audio data. Notably, the term "video" as used herein also encompasses any type of video, subtitles, graphics, or other displayable media content, and can also include audio data.

The device applications 110 also have associated application properties 116, such as properties that indicate whether a device application will restrict recording media content during a screen recording session. When the device applications 110 are installed on the wireless device 102, the device applications that restrict recording media content can be identified by metadata and/or the associated application properties 116, and these types of device applications can be maintained in an application list for subsequent reference.

In this example 100, the wireless device 102 includes a camera device 118, such as a front-facing camera, a rear-facing camera, or multiple camera devices. The camera device 118 can be utilized to capture still images and/or video, which is also displayable on the display screen 108 of the wireless device as the digital image content 114. The many different types of device applications 110 can also generate and display notifications as a type of the digital image content 114 that is displayable on the display screen 108 of the wireless device. For example, the notifications that may be generated by the device applications 110 can be displayed as pop-up notifications, such as to inform the user of the device that a new text or email message has been received, to indicate an upcoming meeting or event, as an indication of an incoming phone call, as a calendar or alarm reminder, as a credit card or banking alert, or as any other type of the many possible pop-up and banner notifications a user may receive on his or her device.

In this example 100, the wireless device 102 also includes an audio module 120, which processes the audio data 122 on the wireless device, such as the audio data generated by the device applications 110 in conjunction with the associated digital image content 114. For example, the gaming application that generates the user interface 112 shown on the display screen 108 of the wireless device also generates the audio data 122 that is associated with the display of the gaming user interface. Generally, the gaming user interface 112 and the corresponding audio data 122 of the gaming application are rendered together by an audio and/or video processing system of the wireless device, such as described with reference to the example device shown in FIG. 9.

The wireless device 102 also includes a microphone 124 that can be utilized to detect external audio content 126, which is captured and processed as part of the audio data 122 by the audio module 120 of the wireless device. For example, a speaker system of the wireless device may emit audio, such as music, a speaker's voice, or other audio generated by a device application 110, and the microphone 124 can pick-up the audio emitted from the speaker system of the device. Similarly, the microphone may detect and pick-up other sounds and voices in the environment in which the wireless device is being used, and the external audio content 126 from the environment may be processed as the audio data 122 by the audio module 120.

In implementations, a screen recording session 128 may be initiated on the wireless device 102 with a media content recording system to capture a recording of the digital image content 114 and the audio data 122, which may include the external audio content 126. Generally, the wireless device includes a screen recording feature, which can be initiated as the screen recording session 128 by a user who is operating the device to capture a sequence of device inputs and operations, application features, and resulting displayed outputs. A user may initiate the screen recording session 128 on the device in any number of various scenarios, such as to create an instruction tutorial for others. Notably, the screen recording session 128 can capture any one or more of the digital image content 114, notifications, the audio data 122, and/or the external audio content 126 in a recording.

However, the user of the wireless device 102 may knowingly or unknowingly open and/or start one of the device applications 110 that do not permit recording, and the application will restrict 130 recording media content during the screen recording session 128. In implementations, a content provider and/or a device application may restrict 130 recording the displayed digital image content 114, the audio data 122, or both during the screen recording session. For example, a user may browse for media content, such as a music track to play along with the car racing game while the screen recording session 128 is recording on the wireless device. However, playback of the music may be restricted due to enforcement of digital rights management, or for copyright issues, and with conventional techniques, the screen recording session 128 will continue to record, but without the music for the time duration that the device application 110 or content provider of the music restricts recording of the audio during the screen recording session.

In another example, a user of the wireless device 102 may start the screen recording session 128 that captures media content from various applications. During the recording, a particular device application 110 may begin executing on the device as the foreground application, either due to the user starting the application or via an incoming notification event, such as an incoming phone call that initiates the cellular communication application on the device, and the application then restricts visual and/or audio recording during the screen recording session on the device. Similarly, a content provider of the media content may include data control and/or data restrictions along with the media content to restrict recording of the digital image content 114, the audio data 122, or both at the device during the screen recording session.

In this example 100, the wireless device 102 implements a content control module 132, which may include independent processing, memory, and/or logic components functioning as a computing and/or electronic device integrated with the wireless device 102. Alternatively or in addition, the content control module 132 can be implemented in software, in hardware, or as a combination of software and hardware components. In this example, the content control module 132 is implemented as a software application or module, such as executable software instructions (e.g., computer-executable instructions) that are executable with a processor (e.g., with the processor system 104) of the wireless device 102 to implement the techniques and features of recorded content managed for restricted screen recording, as described herein.

As a software application or module, the content control module 132 can be stored on computer-readable storage memory (e.g., the memory 106 of the device), or in any other suitable memory device or electronic data storage implemented with the module. Alternatively or in addition, the content control module 132 may be implemented in firmware and/or at least partially in computer hardware. For example, at least part of the modules may be executable by a computer processor, and/or at least part of the modules may be implemented in logic circuitry.

As illustrated in this example 100, media content streams 134, 136 of the various media and data streams in the wireless device 102 are captured and recorded as part of the screen recording session 128, namely the digital image content 114, the audio data 122, and/or the external audio content 126. In implementations, the content control module 132 is implemented to monitor the device applications 110, the media content streams 134, 136, and any other data input streams, such as sensor data from device sensors or subtitle streams from media content data. The content control module 132 can monitor the media content and any other data input streams, and determine that the media content (e.g., the digital image content 114 and/or the audio data 122) is received from a content provider that restricts recording the media content during a screen recording session. Similarly, the content control module 132 can monitor the media content and any other data input streams, and determine that the digital image content 114 and/or the audio data 122 (to include the external audio content 126) is associated with a device application 110 that would restrict 130 the recording of a screen recording session. The content control module 132 can also determine that the device application 110 is executing on the wireless device 102 as a foreground application, such as an application actively executing on the device.

The content control module 132 can then determine that the device application 110 restricts 130 the screen recording session 128 from capturing the digital image content 114 and/or the audio data 122. Based on the previous determinations that the device application 110 is of the type that will restrict 130 the screen recording session 128, such as from the application properties 116, and that the media content is associated with the device application, the content control module 132 can determine that the device application 110 restricts 130 the screen recording session 128. In other implementations, the content control module 132 can determine that the media content is restricted and not being recorded based on the wireless device 102 processing empty video data (e.g., from an empty video file) and/or empty audio data (e.g., from an empty audio file) during the screen recording session. Given that the video and/or audio payloads are empty data files, the audio and video codec processing resources on the wireless device 102 are unnecessarily utilized to process the empty data files that are recorded as blank video data without audio or visual content by the screen recording session 128.

In aspects of recorded content managed for restricted screen recording, as described herein, the content control module 132 is implemented to pause recording 138 the screen recording session 128 for a time duration that the device application 110 restricts 130 the screen recording session. Accordingly, the result is then not a long, blank gap in the screen recording session, which when uploaded for sharing and viewing, results in a poor user experience. In implementations, the content control module 132 generates a shareable screen recording as an aggregation of the media content from the various input streams of digital image content and audio data. The shareable screen recording can then be uploaded and shared via any number of various social media platforms for others to access and playback the recording. In further aspects, the content control module 132 can resume recording 140 the screen recording session 128 after a determination that the screen recording session is no longer being restricted from capturing the media content by the device application. In implementations, the content control module 132 can determine that the device application 110 is executing on the wireless device 102 as a background application, or has been closed, and resume recording 140 the screen recording session.

As noted above, these aspects of pausing recording 138 and then resuming recording 140 of the screen recording session 128 provide for a shareable recording that does not have a long, blank gap in the screen recording. This is further illustrated in the user interface 112 of the auto racing game shown on the display screen 108 of the wireless device 102. The user interface 112 includes a timeline 142 that indicates the recording runs from "0:00" to "11:54" minutes, and includes a playback progress indicator 144 that indicates the first "5:42" minutes of the recording has been displayed for viewing. As an alert or indication to the viewer of the recording, the timeline 142 also shows a time gap 146 in the recording for "1:55" minutes from "7:30" to "9:25", which corresponds to the time duration during which a content provider or the device application 110 restricted 130 or paused the screen recording session 128 from recording the media content (e.g., both the video and the audio). Following the time gap 146, a next timeline section 148 continues from "9:25" to the end of the recording at "11:54".

In this example, and as further shown and described with reference to FIG. 2, the wireless device 102 may receive an incoming event notification, such as an incoming phone call, in which case the audio would be restricted from recording during the screen recording session 128. Additionally, the auto racing game may be paused during the phone call, leading to the time gap 146 in the recording for the "1:55" minutes from "7:30" to "9:25", which corresponds to the time duration during which the screen recording session 128 is restricted or paused from recording the media content (e.g., both the digital image content 114 of the game user interface and the audio of the phone call). In alternate implementations, and as further shown and described with reference to FIG. 3, the timeline 142 may also be used to represent a time gap in the recording during which the digital image content 114 is recorded during the screen recording session, but without the audio which has been restricted from being recorded. Similarly, the screen recording session 128 may include a time gap during which the audio data 122 is recorded, but without the digital image content 114 which has been restricted from being recorded.

Figure 2:
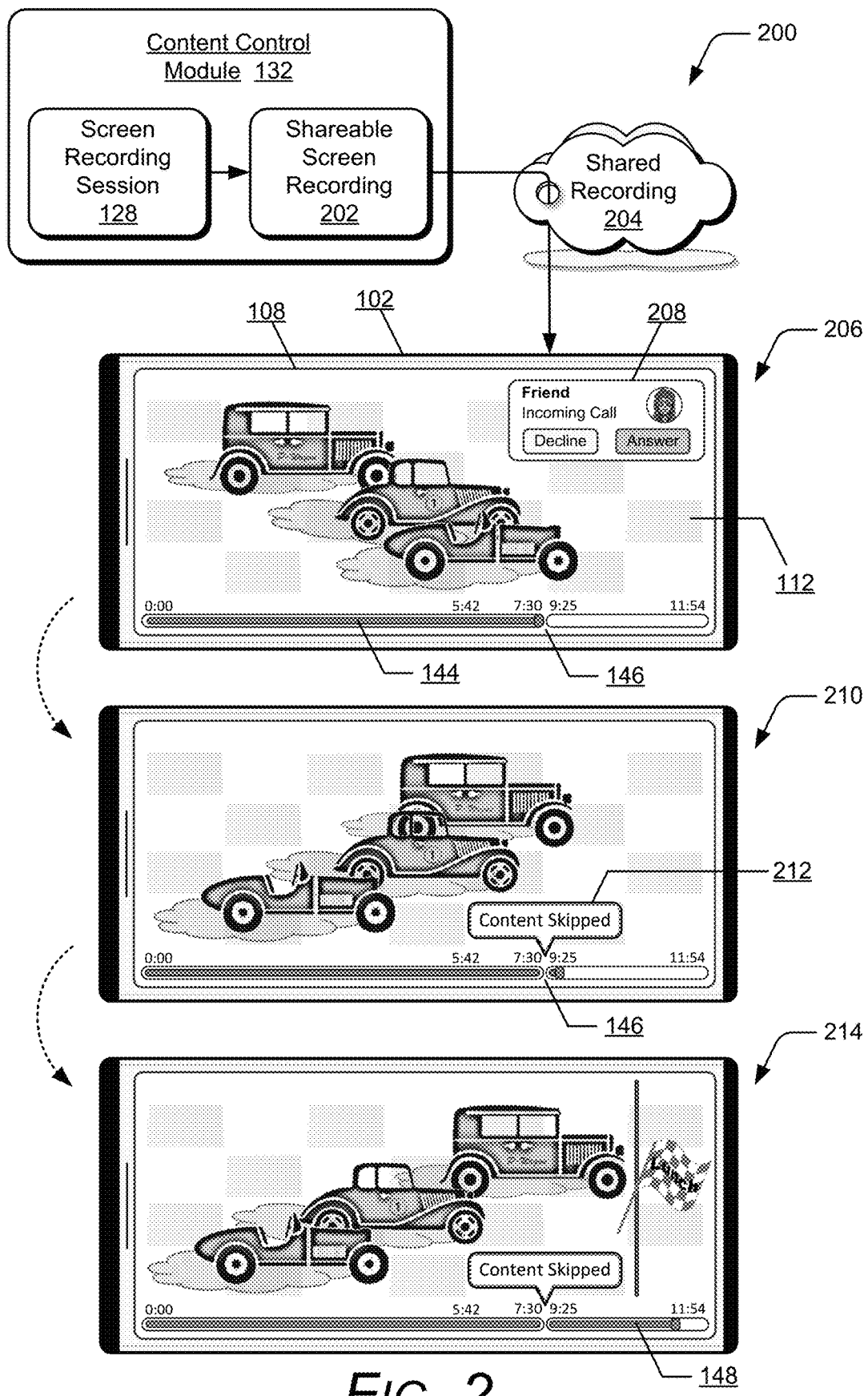
FIGS. 2-4 illustrate examples of features for recorded content managed for restricted screen recording using a wireless device in accordance with one or more implementations as described herein.

FIG. 2 further illustrates examples 200 of aspects and features for recorded content managed for restricted screen recording, as described herein, such as using the wireless device 102 as shown and described with reference to FIG. 1. As shown in these examples, the content control module 132 implemented by the wireless device 102 generates a shareable screen recording 202 from the screen recording session 128. As noted above, the shareable screen recording 202 can be uploaded (e.g., to the "cloud") and shared on social media as a shared recording 204 for others to view.

As shown in the example in FIG. 1 of the user interface 112 for the auto racing game on the display screen 108 of the wireless device 102, and as continued at 206 in FIG. 2, the auto race has continued as indicated by the playback progress indicator 144 having advanced nearly up to the "7:30" minute mark. In this example, the user receives an incoming phone call while playing the auto racing game, and an incoming call notification 208 is displayed over the user interface 112 for the auto racing game on the display screen 108 of the wireless device 102. The cellular communication application (e.g., a device application 110) on the device may then initiate to restrict the audio of the phone call from being recorded during the screen recording session 128. Additionally, the auto racing game is paused during the phone call, leading to the time gap 146 in the recording for the "1:55" minutes from "7:30" to "9:25", which corresponds to the time duration during which the screen recording session 128 is paused from recording the media content (e.g., both the digital image content 114 of the game user interface and the audio of the phone call).

Although the recording will not playback the blank "1:55" minutes as a blank or black screen at the time gap 146 during which the recording was paused while the media content was restricted from being recorded, the discontinuity of a sudden jump or shift in the action occurring in the user interface 112 may appear as a "glitch" or other playback error to the viewer when the recording progresses from the "7:30" minute mark and continues at the "9:25" minute mark. For example as shown at 210, the viewer will likely notice that the racing order of the cars in the auto race have suddenly changed positions from the display of the user interface 112 at 206 when the playback of the recording skips ahead and continues from the "9:25" minute mark. In implementations, the content control module 132 can generate and add a displayable message 212 or other type of indication for the viewer so as to indicate the "content skipped" which correlates with the time gap 146. As continued at 214, the recording continues to playback for viewing from the "9:25" minute mark until the end of the recording, as indicated by the timeline section 148 of the overall timeline 142.

Figure 3:
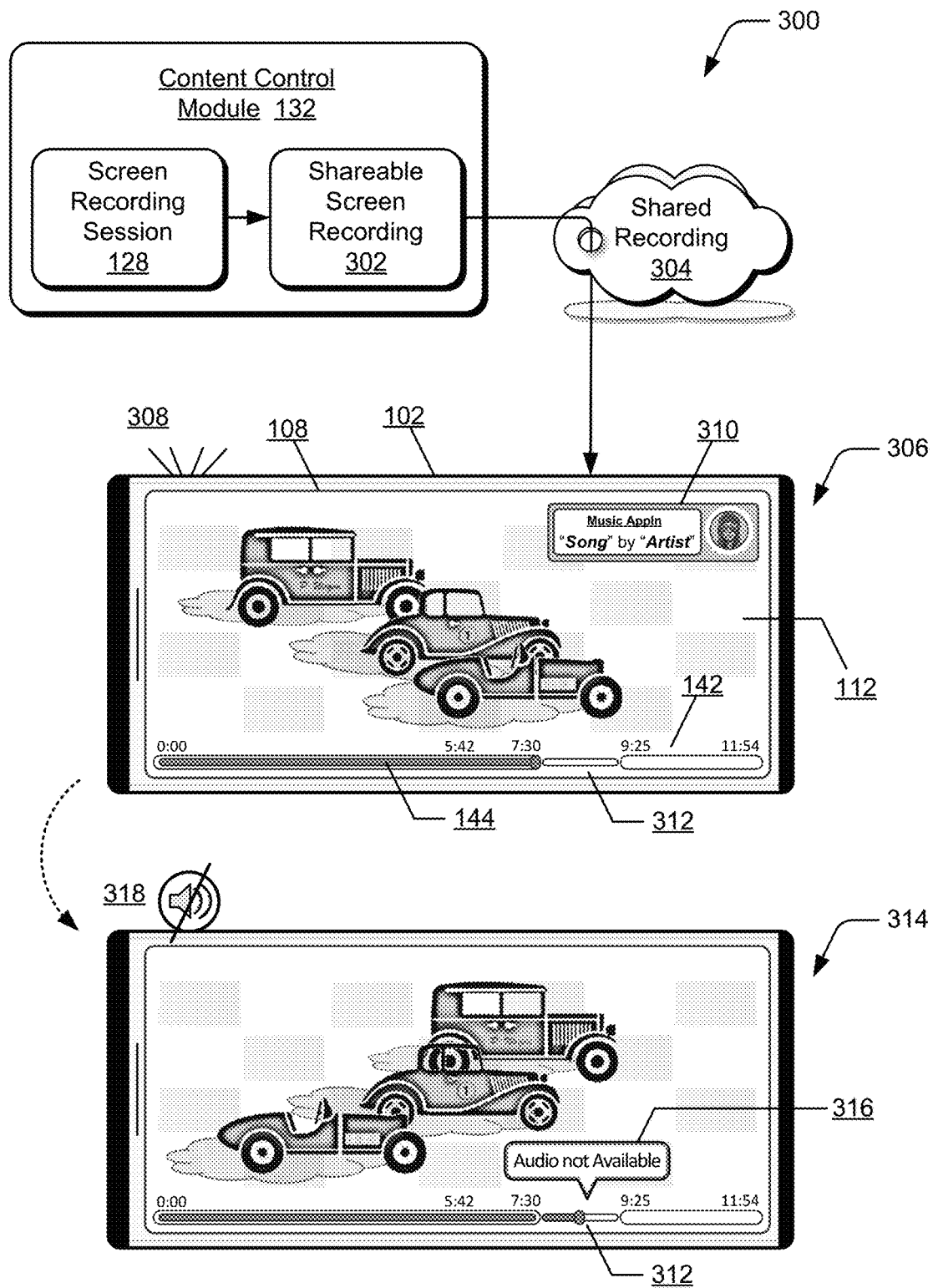

FIG. 3 further illustrates examples 300 of aspects and features for recorded content managed for restricted screen recording, as described herein, such as using the wireless device 102 as shown and described with reference to FIG. 1. As shown in these examples, the content control module 132 implemented by the wireless device 102 generates a shareable screen recording 302 from the screen recording session 128. As noted above, the shareable screen recording 302 can be uploaded (e.g., to the "cloud") and shared on social media as a shared recording 304 for others to view.

As shown in the example in FIG. 1 of the user interface 112 for the auto racing game on the display screen 108 of the wireless device 102, and as continued at 306 in FIG. 3, the auto race has continued as indicated by the playback progress indicator 144 having advanced nearly up to the "7:30" minute mark. Further, as the shared recording 304 is played back on wireless device 102, the audio that corresponds to the auto racing game is emitted at 308 from a speaker of the device. In this example, the user has downloaded and attempted to playback a music track along with the car racing game while the screen recording session 128 was recording on the wireless device.

As shown in the user interface 112, the music track started playing just after the "7:30" minute mark of the recording, such as indicated by the music application notification 310 that is displayed over the user interface 112 for the auto racing game on the display screen 108 of the wireless device 102. However, the music application (e.g., a device application 110) and/or the content provider of the music has restricted the music track from being recorded during the screen recording session 128, such as due to enforcement of digital rights management, or for copyright issues.

Although the audio of the music track is restricted from being recorded during the screen recording session 128, the video of the auto racing game is still recorded as the digital image content 114. In this example, the timeline 142 of the recording includes a visual indication 312 that indicates at least some of the media content was not recorded for the "1:55" minutes from "7:30" to "9:25", which corresponds to the time duration during which the audio of the music track was not recorded during the screen recording session 128. As further shown at 314, the content control module 132 can generate and add a displayable message 316 or other type of indication for the viewer so as to indicate the "audio not available" which correlates with the visual indication 312 of the audio being restricted from recording during the screen recording session 128. There is no audio for playback at 318 during the time duration from "7:30" to "9:25" of the recording.

Returning to the discussion of FIG. 1, and as described above, the content control module 132 can determine that a device application 110 restricts 130 the screen recording session 128 from capturing the media content, such as based on the application properties 116 and/or the wireless device 102 processing empty video data or empty audio data. In an alternate implementation of recorded content managed for restricted screen recording, and rather than pause the screen recording session 128 as described above, the content control module 132 is implemented to add markers as delimiters to the recording to provide easier user navigation when viewing a shared recording that includes the recorded blank video data without audio or visual content. In implementations, the content control module 132 can determine that a device application 110 is executing on the wireless device as a foreground application, which restricts 130 the screen recording session 128. The content control module 132 can then add a start delimiter 150 to the screen recording session 128 as a marker to indicate a beginning section of the screen recording session being restricted by the device application.

Additionally, the content control module 132 can subsequently determine that the device application 110 which restricts 130 the screen recording session 128 is executing on the wireless device 102 as a background application, or has been closed by the user of the device. The content control module 132 can then add an end delimiter 152 to the screen recording session 128 to indicate an end section of the screen recording session being restricted by the device application. The screen recording session 128 is recorded as blank video data without audio or visual content during the time duration that the device application 110 restricts the screen recording session marked by the start delimiter 150 to the end delimiter 152. In implementations, the start delimiter 150 and the end delimiter 152 can be added to the metadata of the file for the screen recording session 128.

Figure 4:
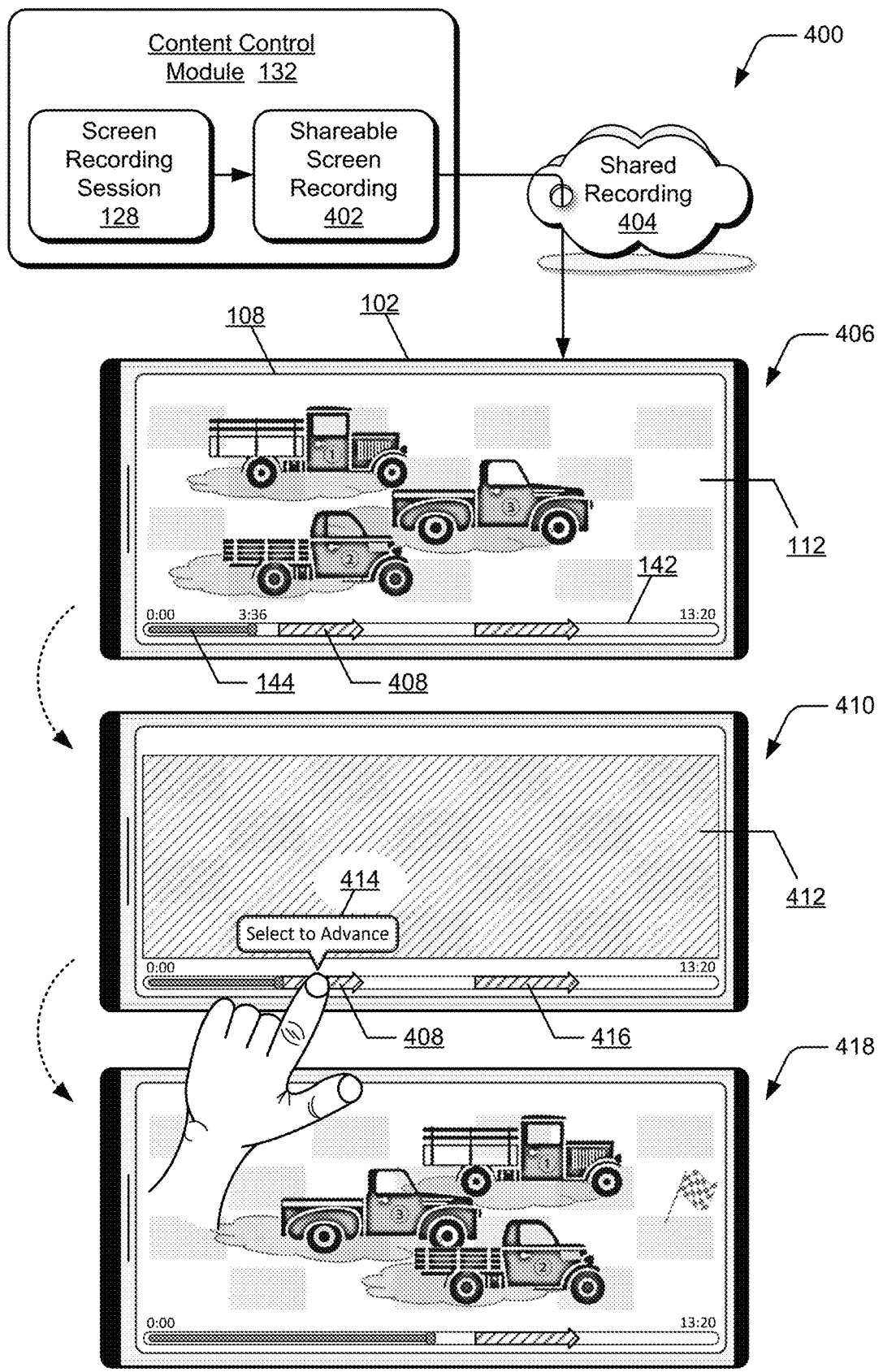

FIG. 4 further illustrates examples 400 of aspects and features for recorded content managed for restricted screen recording, as described herein, such as using the wireless device 102 as shown and described with reference to FIG. 1. As shown in these examples, the content control module 132 implemented by the wireless device 102 generates a shareable screen recording 402 from the screen recording session 128. As noted above, the shareable screen recording 402 can be uploaded (e.g., to the "cloud") and shared on social media as a shared recording 404 for others to view.

As described above with reference to FIG. 1, the recording includes start delimiters 150 and end delimiters 152 as markers to provide easier user navigation when viewing the shared recording 404 that includes the recorded blank video data without audio or visual content. For example, as shown at 406, the user interface 112 for the auto racing game is displayed on the display screen 108 of the wireless device 102. In this example, the user interface 112 includes the timeline 142 that indicates the recording runs from "0:00" to "13:20" minutes, and includes the playback progress indicator 144 that indicates the first "3:36" minutes of the recording has been displayed for viewing. The user interface 112 also includes a blank duration indicator 408, such as the arrow shown in this example, or any other type of visual indication or marker that the section of the recording is blank video data without audio or visual content. Notably, the start of the arrow is a marker that corresponds to a start delimiter 150 and the end of the arrow is a marker that corresponds to an end delimiter 152 to visually convey to the viewer that the section of the recording is blank video data without audio or visual content.

As further illustrated at 410, the recording has advanced into the blank section that was recorded while the device application 110 restricted the screen recording session 128 from capturing the media content. In this example, the user interface 112 of the recording is displayed as a blank or black screen 412 during the time duration indicated by the blank duration indicator 408. In implementations, the content control module 132 may also generate and add a displayable message 414 or other type of indication for the viewer so as to indicate that the blank duration indicator 408 (e.g., the arrow) can be selected (e.g., with a touch selection) to skip advance through the blank section of the recording. Additionally, this example illustrates that a screen recording session 128 may be restricted from capturing the media content more than once, such as indicated by an additional blank duration indicator 416, which the viewer may also select to skip advance through the additional blank section of the recording. As further illustrated at 418, the recording has advanced past the restricted, blank section that is displayed as the blank or black screen 412, and the trucks in the auto race resume displaying on the display screen 108 of the wireless device 102 in the user interface 112.

Example methods 500, 600, 700, and 800 are described with reference to respective FIGS. 5-8 in accordance with implementations of recorded content managed for restricted screen recording. Generally, any services, components, modules, methods, and/or operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 5:
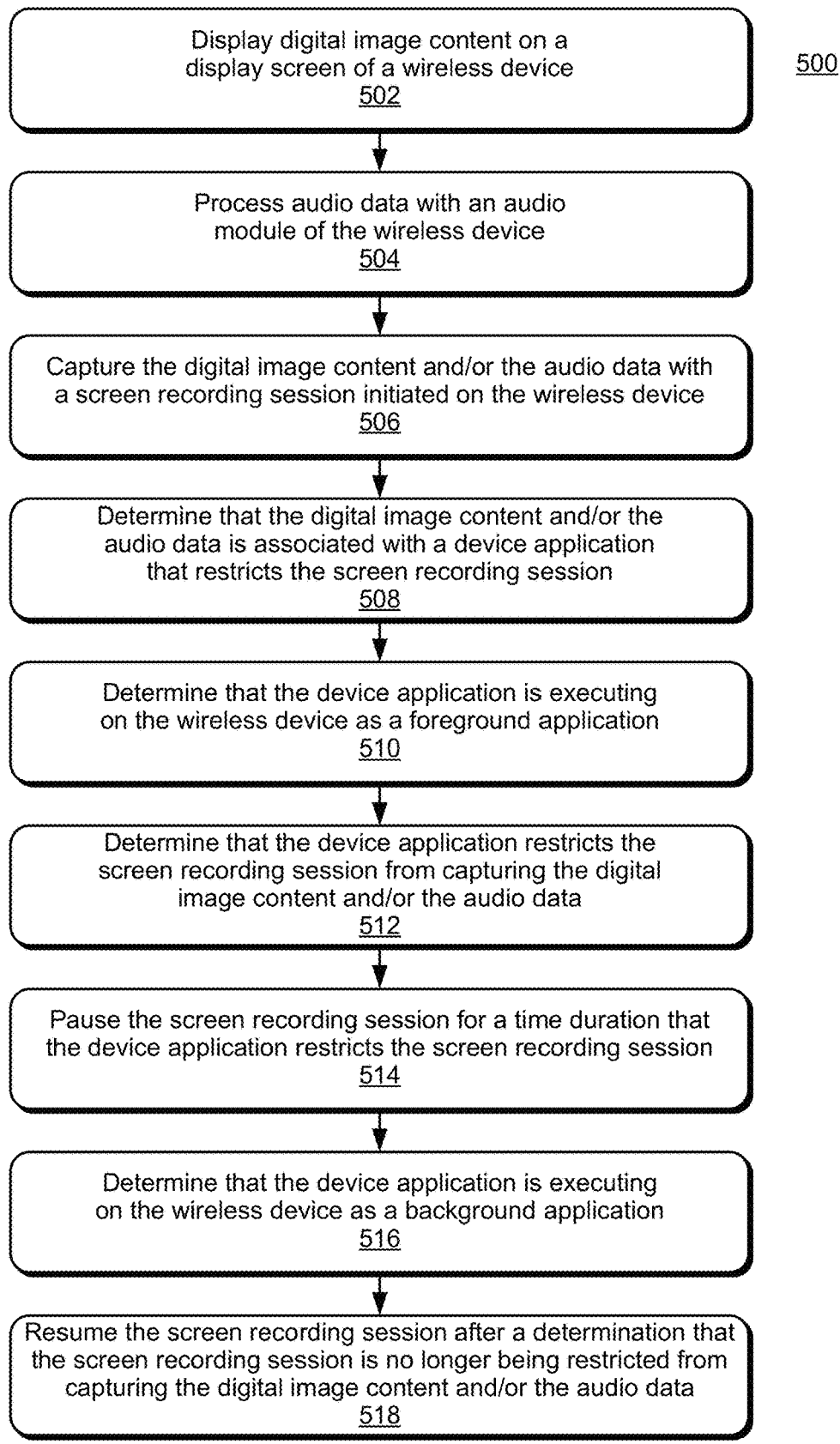
FIGS. 5-8. illustrate example methods of recorded content managed for restricted screen recording in accordance with one or more implementations of the techniques described herein.

FIG. 5 illustrates example method(s) 500 of recorded content managed for restricted screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 502, digital image content is displayed on a display screen of a wireless device. For example, the wireless device 102 includes any number of device applications 110 that generate digital image content 114, which is displayed for user interaction and viewing on the display screen 108 of the device, such as the user interface 112 of a gaming application displayed on the display screen 108 of the wireless device. The display screen 108 of the wireless device 102 can display an application user interface, or any other type of digital image content 114, associated with any of the device applications 110. Generally, an application user interface, or any other type of video, image, graphics, and the like is digital image content 114 that is displayable on the display screen 108 of the wireless device. In implementations, the digital image content 114 that is displayed on the display screen 108 may be captured with a camera device 118 of the wireless device.

At 504, audio data is processed with an audio module of the wireless device. For example, the audio module 120 of the wireless device 102 processes the audio data 122 on the wireless device, such as the audio data generated by the device applications 110 in conjunction with the associated digital image content 114. For example, the gaming application that generates the user interface 112 displayed on the display screen 108 of the wireless device also generates the audio data 122 that is associated with the display of the gaming user interface. Generally, the gaming user interface 112 and the corresponding audio data 122 of the gaming application are rendered together by an audio and/or video processing system of the wireless device, such as described with reference to the example device shown in FIG. 9. In implementations, external audio content 126 is detected with the microphone 124 of the wireless device, and the external audio content 126 is processed as the audio data 122 with the audio module 120 of the wireless device.

At 506, the digital image content and/or the audio data is captured with a screen recording session initiated on the wireless device. For example, the wireless device 102 includes a screen recording feature, which is initiated as the screen recording session 128 to capture the media content, such as any one or more of the digital image content 114, notifications, the audio data 122, and/or the external audio content 126 in a recording.

At 508, a determination is made that the digital image content and/or the audio data is associated with a device application that restricts the screen recording session. For example, the content control module 132 implemented by the wireless device 102 monitors the media content and determines that the digital image content 114 and/or the audio data 122 (to include the external audio content 126) is associated with a device application 110 that would restrict 130 the recording of the screen recording session 128.

At 510, a determination is made that the device application is executing on the wireless device as a foreground application. For example, the content control module 132 implemented by the wireless device 102 determines that the device application 110, which would restrict the recording of the screen recording session 128, is executing on the wireless device 102 as a foreground application, such as an application actively executing on the device.

At 512, a determination is made that the device application restricts the screen recording session from capturing the digital image content and/or the audio data. For example, the content control module 132 implemented by the wireless device 102 determines that the device application 110 restricts 130 the screen recording session 128 from capturing the digital image content 114 and/or the audio data 122. Based on the previous determinations that the device application 110 is of the type that will restrict 130 the screen recording session 128, such as from the application properties 116, and that the media content is associated with the device application, the content control module 132 can determine that the device application 110 restricts 130 the screen recording session 128. In other implementations, the content control module 132 can determine that the media content is restricted and not being recorded based on the wireless device 102 processing empty video data (e.g., from an empty video file) and/or empty audio data (e.g., from an empty audio file) during the screen recording session.

At 514, the screen recording session is paused for a time duration that the device application restricts the screen recording session. For example, the content control module 132 implemented by the wireless device 102 pauses recording 138 the screen recording session 128 for a time duration that the device application 110 restricts 130 the screen recording session. The screen recording session 128 is paused from capturing the media content during the screen recording session for the time duration that the device application 110 restricts the screen recording session.

At 516, a determination is made that the device application is executing on the wireless device as a background application. For example, the content control module 132 implemented by the wireless device 102 determines that the device application 110, which restricts the recording of the screen recording session 128, is executing on the wireless device 102 as a background application, or has been closed on the device.

At 518, the screen recording session is resumed after a determination that the screen recording session is no longer being restricted from capturing the digital image content and/or the audio data. For example, the content control module 132 implemented by the wireless device 102 resumes recording 140 the screen recording session 128 after the determination that the screen recording session 128 is no longer being restricted from capturing the media content by the device application.

Figure 6:
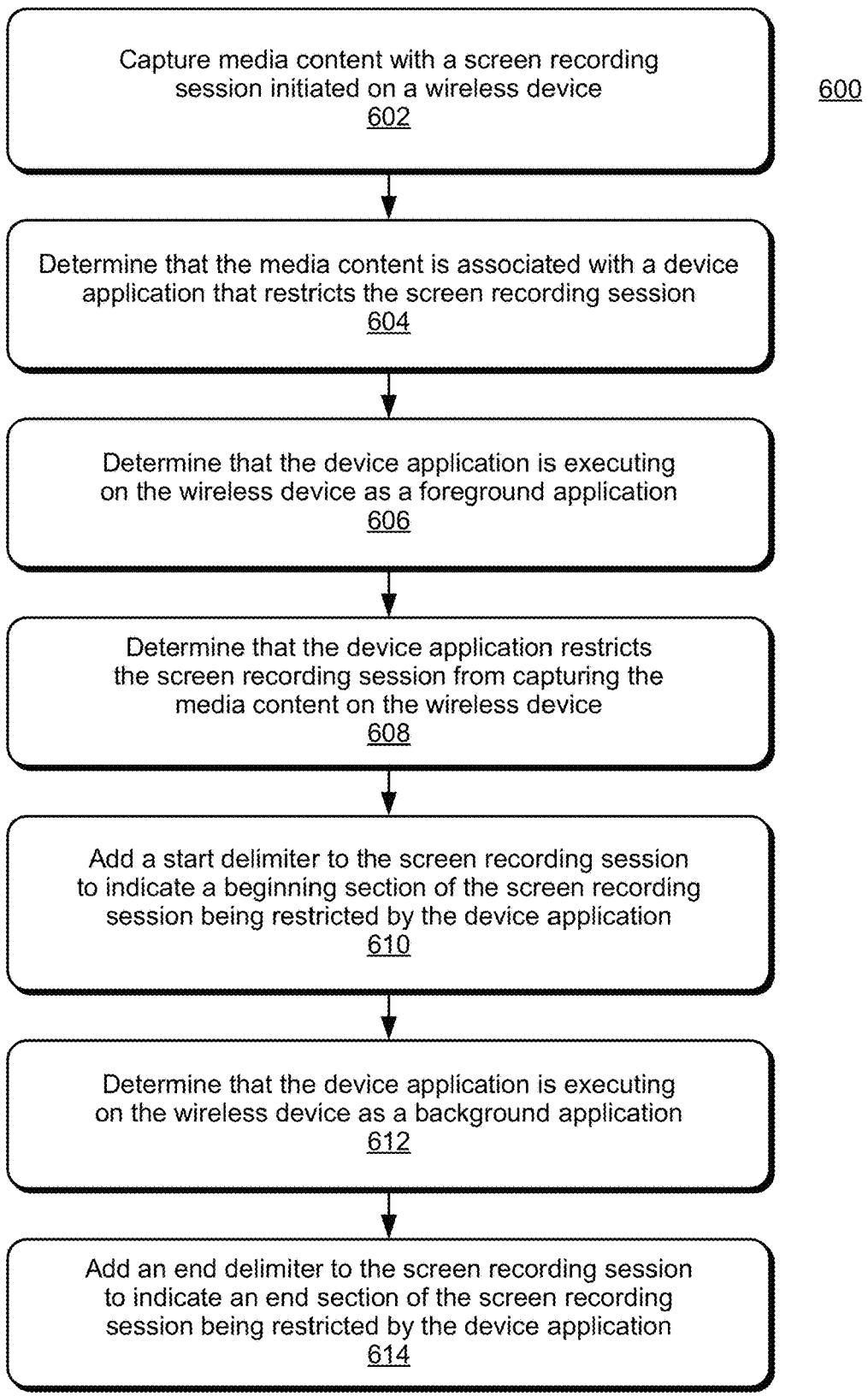

FIG. 6 illustrates example method(s) 600 of recorded content managed for restricted screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 602, media content is captured with a screen recording session initiated on a wireless device. For example, the wireless device 102 includes a screen recording feature, which is initiated as the screen recording session 128 to capture the media content, such as the digital image content 114 displayed on the display screen 108 of the wireless device and/or the audio data 122 processed with the audio module 120 of the wireless device.

At 604, a determination is made that the media content is associated with a device application that restricts the screen recording session. For example, the content control module 132 implemented by the wireless device 102 monitors the media content and determines that the media content (e.g., the digital image content 114 and/or the audio data 122) is associated with a device application 110 that would restrict 130 the recording of the screen recording session 128.

At 606, a determination is made that the device application is executing on the wireless device as a foreground application. For example, the content control module 132 implemented by the wireless device 102 determines that the device application 110, which would restrict the recording of the screen recording session 128, is executing on the wireless device 102 as a foreground application, such as an application actively executing on the device.

At 608, a determination is made that the device application restricts the screen recording session from capturing the media content on the wireless device. For example, the content control module 132 implemented by the wireless device 102 determines that the device application 110 restricts 130 the screen recording session 128 from capturing the media content. Based on the previous determinations that the device application 110 is of the type that will restrict 130 the screen recording session 128, such as from the application properties 116, and that the media content is associated with the device application, the content control module 132 can determine that the device application 110 restricts 130 the screen recording session 128. In other implementations, the content control module 132 can determine that the media content is restricted and not being recorded based on the wireless device 102 processing empty video data (e.g., from an empty video file) and/or empty audio data (e.g., from an empty audio file) during the screen recording session.

At 610, a start delimiter is added to the screen recording session to indicate a beginning section of the screen recording session being restricted by the device application. For example, the content control module 132 implemented by the wireless device 102 adds a start delimiter 150 to the screen recording session 128 as a marker to indicate a beginning section of the screen recording session being restricted by the device application.

At 612, a determination is made that the device application is executing on the wireless device as a background application. For example, the content control module 132 implemented by the wireless device 102 determines that the device application 110, which restricts the recording of the screen recording session 128, is executing on the wireless device 102 as a background application, or has been closed on the device.

At 614, an end delimiter is added to the screen recording session to indicate an end section of the screen recording session being restricted by the device application. For example, the content control module 132 implemented by the wireless device 102 adds an end delimiter 152 to the screen recording session 128 to indicate an end section of the screen recording session being restricted by the device application. The screen recording session 128 continues for a time duration defined by the start delimiter 150 to the end delimiter 152. The screen recording session 128 is recorded as blank video data without audio or visual content during the time duration that the device application 110 restricts the screen recording session marked by the start delimiter 150 to the end delimiter 152.

Figure 7:
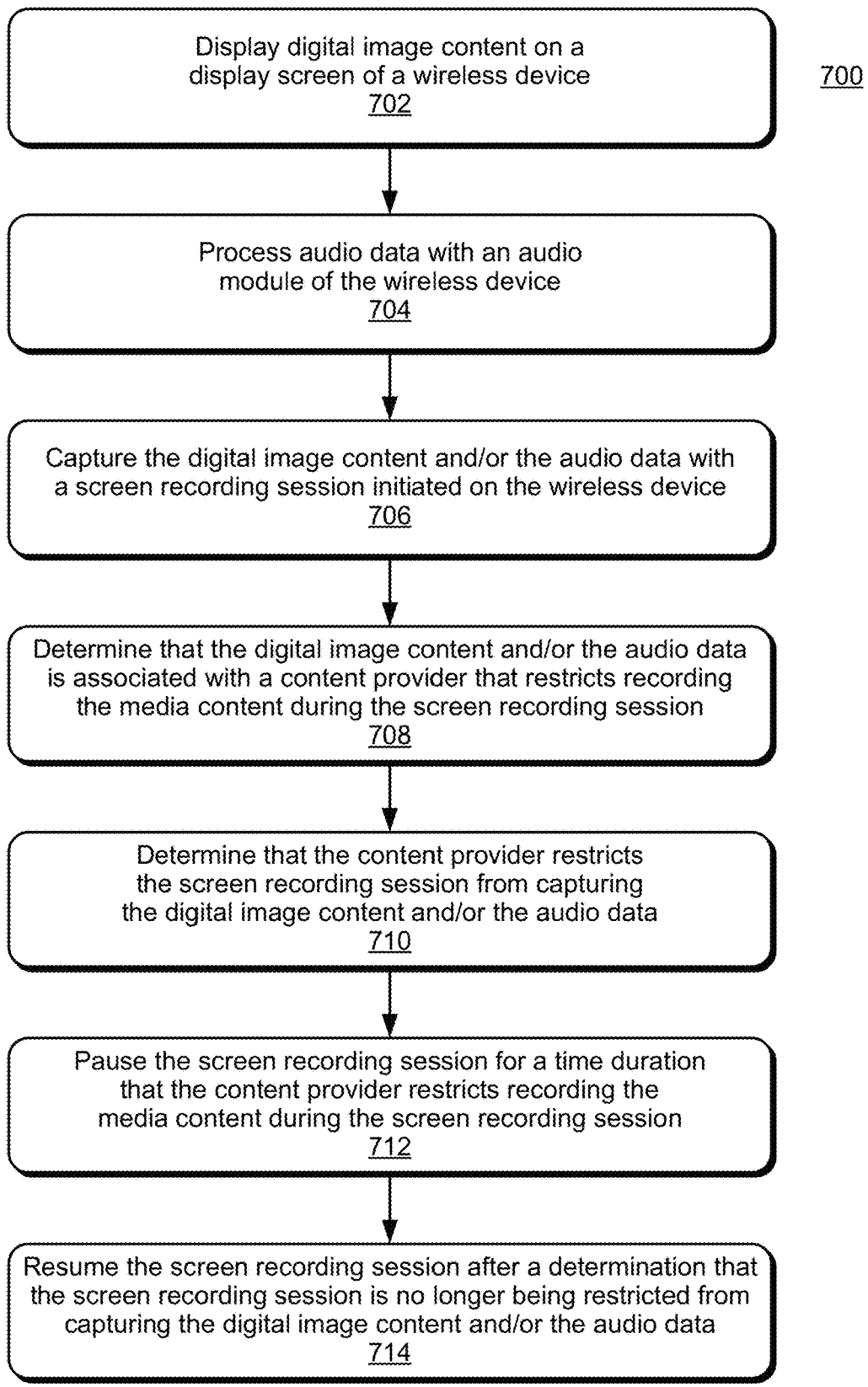

FIG. 7 illustrates example method(s) 700 of recorded content managed for restricted screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 702, digital image content is displayed on a display screen of a wireless device. For example, the wireless device 102 includes any number of device applications 110 that generate digital image content 114, which is displayed for user interaction and viewing on the display screen 108 of the device, such as the user interface 112 of a gaming application displayed on the display screen 108 of the wireless device. Alternatively or in addition, the user of the device may initiate to receive media content and/or other types of data from a content provider, and the media content is rendered as audio via a speaker of the device and/or displayed for viewing on the display screen of the device. The display screen 108 of the wireless device 102 can display an application user interface, or any other type of digital image content 114, associated with any of the device applications 110. Generally, an application user interface, or any other type of video, image, graphics, and the like is digital image content 114 that is displayable on the display screen 108 of the wireless device. In implementations, the digital image content 114 that is displayed on the display screen 108 may be captured with a camera device 118 of the wireless device.

At 704, audio data is processed with an audio module of the wireless device. For example, the audio module 120 of the wireless device 102 processes the audio data 122 on the wireless device, such as the audio data generated by the device applications 110 in conjunction with the associated digital image content 114 and/or audio data received from a content provider. For example, the gaming application that generates the user interface 112 displayed on the display screen 108 of the wireless device also generates the audio data 122 that is associated with the display of the gaming user interface. Generally, the gaming user interface 112 and the corresponding audio data 122 of the gaming application are rendered together by an audio and/or video processing system of the wireless device, such as described with reference to the example device shown in FIG. 9. In implementations, external audio content 126 is detected with the microphone 124 of the wireless device, and the external audio content 126 is processed as the audio data 122 with the audio module 120 of the wireless device.

At 706, the digital image content and/or the audio data is captured with a screen recording session initiated on the wireless device. For example, the wireless device 102 includes a screen recording feature, which is initiated as the screen recording session 128 to capture the media content, such as any one or more of the digital image content 114, notifications, the audio data 122, and/or the external audio content 126 in a recording.

At 708, a determination is made that the digital image content and/or the audio data is associated with a content provider that restricts recording the media content during the screen recording session. For example, the content control module 132 implemented by the wireless device 102 monitors the media content (e.g., the digital image content and/or the audio data) and determines that the digital image content 114 and/or the audio data 122 (to include the external audio content 126) is associated with a content provider that would restrict 130 the recording of the media content during the screen recording session 128.

At 710, a determination is made that the content provider restricts the screen recording session from capturing the digital image content and/or the audio data. For example, the content control module 132 implemented by the wireless device 102 determines that the content provider restricts 130 the screen recording session 128 from capturing the digital image content 114 and/or the audio data 122. Based on the previous determinations that the content provider is of the type that will restrict 130 the screen recording session 128, the content control module 132 can determine that a device application 110, such as a web browsing application, is notified or controlled by the content provider to restrict 130 the screen recording session 128.

At 712, the screen recording session is paused for a time duration that the content provider restricts recording the media content during the screen recording session. For example, the content control module 132 implemented by the wireless device 102 pauses recording 138 the screen recording session 128 for a time duration that the content provider restricts 130 recording the media content during the screen recording session. The screen recording session 128 is paused from capturing the media content during the screen recording session for the time duration that the content provider restricts the screen recording session.

At 714, the screen recording session is resumed after a determination that the screen recording session is no longer being restricted from capturing the digital image content and/or the audio data. For example, the content control module 132 implemented by the wireless device 102 resumes recording 140 the screen recording session 128 after the determination that the screen recording session 128 is no longer being restricted from capturing the media content by the content provider.

Figure 8:
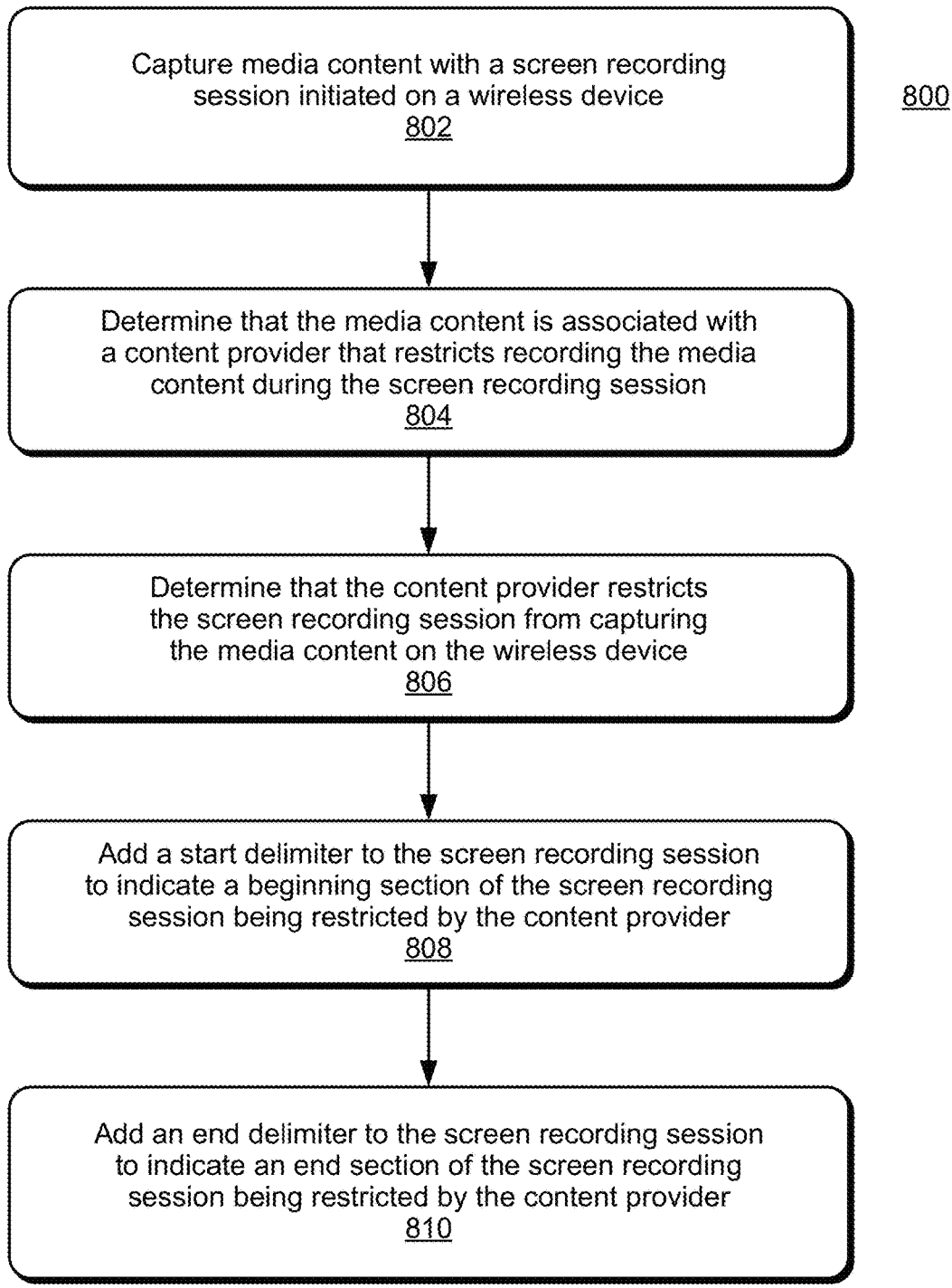

FIG. 8 illustrates example method(s) 800 of recorded content managed for restricted screen recording, and is generally described with reference to a wireless device, as well as a content control module implemented by the device. The order in which the method is described is not intended to be construed as a limitation, and any number or combination of the described method operations can be performed in any order to perform a method, or an alternate method.

At 802, media content is captured with a screen recording session initiated on a wireless device. For example, the wireless device 102 includes a screen recording feature, which is initiated as the screen recording session 128 to capture the media content, such as the digital image content 114 displayed on the display screen 108 of the wireless device and/or the audio data 122 processed with the audio module 120 of the wireless device.

At 804, a determination is made that the media content is associated with a content provider that restricts recording the media content during the screen recording session. For example, the content control module 132 implemented by the wireless device 102 monitors the media content and determines that the media content (e.g., the digital image content 114 and/or the audio data 122) is associated with a content provider that would restrict 130 the recording of the media content during the screen recording session 128. For example, a content provider of the media content may include data control and/or data restrictions along with the media content to restrict any recording of the media content at the device.

At 806, a determination is made that the content provider restricts the screen recording session from capturing the media content on the wireless device. For example, the content control module 132 implemented by the wireless device 102 determines that the content provider of the media content restricts 130 the screen recording session 128 from capturing the media content. Based on the previous determination that the content provider is of the type that will restrict 130 the screen recording session 128, the content control module 132 can determine that a device application 110, such as a web browsing application, is notified or controlled by the content provider to restrict 130 the screen recording session 128.

At 808, a start delimiter is added to the screen recording session to indicate a beginning section of the screen recording session being restricted by the content provider. For example, the content control module 132 implemented by the wireless device 102 adds a start delimiter 150 to the screen recording session 128 as a marker to indicate a beginning section of the screen recording session being restricted by the content provider.

At 810, an end delimiter is added to the screen recording session to indicate an end section of the screen recording session being restricted by the content provider. For example, the content control module 132 implemented by the wireless device 102 adds an end delimiter 152 to the screen recording session 128 to indicate an end section of the screen recording session being restricted by the content provider of the media content. The screen recording session 128 continues for a time duration defined by the start delimiter 150 to the end delimiter 152. The screen recording session 128 is recorded as blank video data without audio and/or visual content during the time duration that the content provider restricts recording of the media content during the screen recording session marked by the start delimiter 150 to the end delimiter 152.

Figure 9:
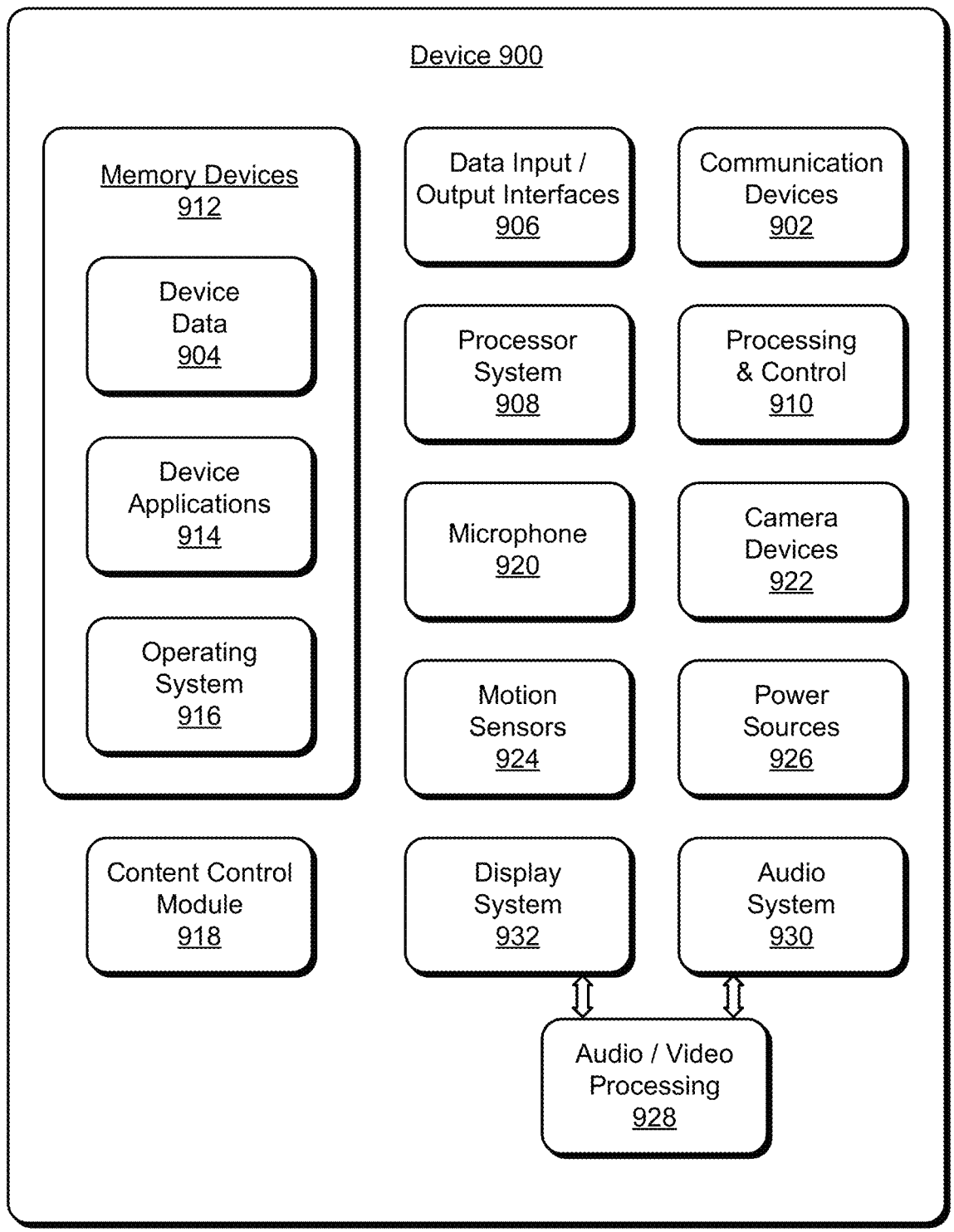
FIG. 9 illustrates various components of an example device that can be used to implement the techniques for recorded content managed for restricted screen recording as described herein.

FIG. 9 illustrates various components of an example device 900, which can implement aspects of the techniques and features for recorded content managed for restricted screen recording, as described herein. The example device 900 can be implemented as any of the devices described with reference to the previous FIGS. 1-8, such as any type of a wireless device, mobile device, mobile phone, flip phone, client device, companion device, paired device, display device, tablet, computing, communication, entertainment, gaming, media playback, and/or any other type of computing and/or electronic device. For example, the wireless device 102 described with reference to FIGS. 1-8 may be implemented as the example device 900.

The example device 900 can include various, different communication devices 902 that enable wired and/or wireless communication of device data 904 with other devices. The device data 904 can include any of the various devices data and content that is generated, processed, determined, received, stored, and/or transferred from one computing device to another, and/or synched between multiple computing devices. Generally, the device data 904 can include any form of audio, video, image, graphics, and/or electronic data that is generated by applications executing on a device. The communication devices 902 can also include transceivers for cellular phone communication and/or for any type of network data communication.

The example device 900 can also include various, different types of data input/output (I/O) interfaces 906, such as data network interfaces that provide connection and/or communication links between the devices, data networks, and other devices. The I/O interfaces 906 can be used to couple the device to any type of components, peripherals, and/or accessory devices, such as a computer input device that may be integrated with the example device 900. The I/O interfaces 906 may also include data input ports via which any type of data, information, media content, communications, messages, and/or inputs can be received, such as user inputs to the device, as well as any type of audio, video, image, graphics, and/or electronic data received from any content and/or data source.

The example device 900 includes a processor system 908 of one or more processors (e.g., any of microprocessors, controllers, and the like) and/or a processor and memory system implemented as a system-on-chip (SoC) that processes computer-executable instructions. The processor system may be implemented at least partially in computer hardware, which can include components of an integrated circuit or on-chip system, an application-specific integrated circuit (ASIC), a field-programmable gate array (FPGA), a complex programmable logic device (CPLD), and other implementations in silicon and/or other hardware. Alternatively or in addition, the device can be implemented with any one or combination of software, hardware, firmware, or fixed logic circuitry that may be implemented in connection with processing and control circuits, which are generally identified at 910. The example device 900 may also include any type of a system bus or other data and command transfer system that couples the various components within the device. A system bus can include any one or combination of different bus structures and architectures, as well as control and data lines.

The example device 900 also includes memory and/or memory devices 912 (e.g., computer-readable storage memory) that enable data storage, such as data storage devices implemented in hardware that can be accessed by a computing device, and that provide persistent storage of data and executable instructions (e.g., software applications, programs, functions, and the like). Examples of the memory devices 912 include volatile memory and non-volatile memory, fixed and removable media devices, and any suitable memory device or electronic data storage that maintains data for computing device access. The memory devices 912 can include various implementations of random-access memory (RAM), read-only memory (ROM), flash memory, and other types of storage media in various memory device configurations. The example device 900 may also include a mass storage media device.

The memory devices 912 (e.g., as computer-readable storage memory) provide data storage mechanisms, such as to store the device data 904, other types of information and/or electronic data, and various device applications 914 (e.g., software applications and/or modules). For example, an operating system 916 can be maintained as software instructions with a memory device and executed by the processor system 908 as a software application. The device applications 914 may also include a device manager, such as any form of a control application, software application, signal-processing and control module, code that is specific to a particular device, a hardware abstraction layer for a particular device, and so on.

In this example, the device 900 includes a content control module 918 that implements various aspects of the described features and techniques for recorded content managed for restricted screen recording. The content control module 918 can be implemented with hardware components and/or in software as one of the device applications 914, such as when the example device 900 is implemented as the wireless device 102 described with reference to FIGS. 1-8. An example of the content control module 918 includes the content control module 132 that is implemented by the wireless device 102, such as a software application and/or as hardware components in the wireless device. In implementations, the content control module 918 may include independent processing, memory, and logic components as a computing and/or electronic device integrated with the example device 900.

The example device 900 can also include a microphone 920 and/or camera devices 922, as well as motion sensors 924, such as may be implemented as components of an inertial measurement unit (IMU). The motion sensors 924 can be implemented with various sensors, such as a gyroscope, an accelerometer, and/or other types of motion sensors to sense motion of the device. The motion sensors 924 can generate sensor data vectors having three-dimensional parameters (e.g., rotational vectors in x, y, and z-axis coordinates) indicating location, position, acceleration, rotational speed, and/or orientation of the device. The example device 900 can also include one or more power sources 926, such as when the device is implemented as a wireless device and/or mobile device. The power sources may include a charging and/or power system, and can be implemented as a flexible strip battery, a rechargeable battery, a charged super-capacitor, and/or any other type of active or passive power source.

The example device 900 can also include an audio and/or video processing system 928 that generates audio data for an audio system 930 and/or generates display data for a display system 932. The audio system and/or the display system may include any types of devices or modules that generate, process, display, and/or otherwise render audio, video, display, and/or image data. Display data and audio signals can be communicated to an audio component and/or to a display component via any type of audio and/or video connection or data link. In implementations, the audio system and/or the display system are integrated components of the example device 900. Alternatively, the audio system and/or the display system are external, peripheral components to the example device.

Although implementations of recorded content managed for restricted screen recording have been described in language specific to features and/or methods, the appended claims are not necessarily limited to the specific features or methods described. Rather, the specific features and methods are disclosed as example implementations of recorded content managed for restricted screen recording, and other equivalent features and methods are intended to be within the scope of the appended claims. Further, various different examples are described and it is to be appreciated that each described example can be implemented independently or in connection with one or more other described examples. Additional aspects of the techniques, features, and/or methods discussed herein relate to one or more of the following:

A wireless device, comprising: a display screen to display digital image content; an audio module to process audio data; a screen recording session configured to capture at least one of the digital image content and the audio data; a content control module implemented at least partially in hardware and configured to: determine that a device application restricts the screen recording session from capturing one or more of the digital image content and the audio data; pause the screen recording session for a time duration that the device application restricts the screen recording session; and resume the screen recording session after a determination that the screen recording session is no longer being restricted from capturing one or more of the digital image content and the audio data.

Alternatively or in addition to the above described wireless device, any one or combination of: the content control module is configured to determine that the digital image content or the audio data is associated with the device application that restricts the screen recording session. The content control module is configured to determine that the device application is executing on the wireless device as a foreground application, and pause the screen recording session. The content control module is configured to determine that the device application restricts the screen recording based on the wireless device processing empty video data or empty audio data during the screen recording session. The content control module is configured to determine that the device application is executing on the wireless device as a background application, and resume the screen recording session. The wireless device further comprising a microphone to detect external audio content that is processed as the audio data, and wherein the content control module is configured to pause the screen recording session from capturing the external audio content during the screen recording session for the time duration that the device application restricts the screen recording session. The wireless device further comprising a camera device to capture the digital image content that is displayed on the display screen, and wherein the content control module is configured to pause the screen recording session from capturing the digital image content during the screen recording session for the time duration that the device application restricts the screen recording session.

A method, comprising: displaying digital image content on a display screen of a wireless device; processing audio data with an audio module of the wireless device; capturing at least one of the digital image content and the audio data with a screen recording session initiated on the wireless device; determining that a device application restricts the screen recording session from the capturing one or more of the digital image content and the audio data; pausing the screen recording session for a time duration that the device application restricts the screen recording session; and resuming the screen recording session after a determination that the screen recording session is no longer being restricted from the capturing one or more of the digital image content and the audio data.

Alternatively or in addition to the above described method, any one or combination of: determining that the digital image content or the audio data is associated with the device application that restricts the screen recording session. The method further comprising determining that the device application is executing on the wireless device as a foreground application, and pausing the screen recording session based on the device application executing as the foreground application. The determining that the device application restricts the screen recording is based on the wireless device processing empty video data or empty audio data during the screen recording session. The method further comprising determining that the device application is executing on the wireless device as a background application, and resuming the screen recording session based on the device application executing as a background application. The method further comprising detecting external audio content with a microphone of the wireless device, the external audio content being processed as the audio data; and pausing the screen recording session from capturing the external audio content during the screen recording session for the time duration that the device application restricts the screen recording session. The method further comprising capturing the digital image content that is displayed on the display screen with a camera device of the wireless device; and pausing the screen recording session from capturing the digital image content during the screen recording session for the time duration that the device application restricts the screen recording session.

A method, comprising: capturing media content with a screen recording session initiated on a wireless device; determining that a device application restricts the screen recording session from the capturing the media content on the wireless device; adding a start delimiter to the screen recording session to indicate a beginning section of the screen recording session being restricted by the device application; adding an end delimiter to the screen recording session to indicate an end section of the screen recording session being restricted by the device application, the screen recording session continuing for a time duration defined by the start delimiter to the end delimiter.

Alternatively or in addition to the above described method, any one or combination of: the media content captured by the screen recording session is at least one of digital image content displayed on a display screen of the wireless device or audio data processed with an audio module of the wireless device. The screen recording session is recorded as blank video data without audio or visual content during the time duration that the device application restricts the screen recording session marked by the start delimiter to the end delimiter. The method further comprising determining that the device application is executing on the wireless device as a foreground application, and adding the start delimiter to the screen recording session. The determining that the device application restricts the screen recording is based on the wireless device processing empty video data or empty audio data during the screen recording session. The method further comprising determining that the device application is executing on the wireless device as a background application, and adding the end delimiter to the screen recording session.

The invention claimed is:

1. A wireless device, comprising:
a display screen to display digital image content;
an audio module to process audio data;
a screen recording session configured to capture at least one of the digital image content and the audio data;
a content control module implemented at least partially in hardware and configured to:
determine that a device application restricts the screen recording session from capturing one or more of the digital image content and the audio data;
pause the screen recording session for a time duration that the device application restricts the screen recording session;
resume the screen recording session without user input after a determination that the screen recording session is no longer being restricted from capturing one or more of the digital image content and the audio data; and
add a displayable indication to the screen recording session to indicate the time duration between which the screen recording session is paused and resumed.

2. The wireless device of claim 1, wherein the content control module is configured to determine that the digital image content or the audio data is associated with the device application that restricts the screen recording session.

3. The wireless device of claim 1, wherein the content control module is configured to determine that the device application is executing on the wireless device as a foreground application, and pause the screen recording session.

4. The wireless device of claim 1, wherein the content control module is configured to determine that the device application restricts the screen recording session based on the wireless device processing empty video data or empty audio data during the screen recording session.

5. The wireless device of claim 1, wherein the content control module is configured to determine that the device application is executing on the wireless device as a background application, and resume the screen recording session.

6. The wireless device of claim 1, further comprising:
a microphone to detect external audio content that is processed as the audio data, and wherein the content control module is configured to:
pause the screen recording session from capturing the external audio content during the screen recording session for the time duration that the device application restricts the screen recording session.

7. The wireless device of claim 1, further comprising:
a camera device to capture the digital image content that is displayed on the display screen, and wherein the content control module is configured to:
pause the screen recording session from capturing the digital image content during the screen recording session for the time duration that the device application restricts the screen recording session.

8. A method, comprising:
displaying digital image content on a display screen of a wireless device;
processing audio data with an audio module of the wireless device;
capturing at least one of the digital image content or the audio data with a screen recording session initiated on the wireless device;
determining that a device application restricts the screen recording session from the capturing at least one of the digital image content or the audio data;
pausing the screen recording session for a time duration that the device application restricts the screen recording session;
resuming the screen recording session after a determination that the screen recording session is no longer being restricted from the capturing at least one of the digital image content or the audio data; and
adding a displayable message to the screen recording session as an indication of content being skipped during the time duration between when the screen recording session is paused and resumed.

9. The method of claim 8, further comprising:
determining that the digital image content or the audio data is associated with the device application that restricts the screen recording session.

10. The method of claim 8, further comprising:
determining that the device application is executing on the wireless device as a foreground application, and pausing the screen recording session based on the device application executing as the foreground application.

11. The method of claim 8, wherein the determining that the device application restricts the screen recording session is based on the wireless device processing empty video data or empty audio data during the screen recording session.

12. The method of claim 8, further comprising:
determining that the device application is executing on the wireless device as a background application, and resuming the screen recording session based on the device application executing as a background application.

13. The method of claim 8, further comprising:
detecting external audio content with a microphone of the wireless device, the external audio content being processed as the audio data; and
pausing the screen recording session from capturing the external audio content during the screen recording session for the time duration that the device application restricts the screen recording session.

14. The method of claim 8, further comprising:
capturing the digital image content that is displayed on the display screen with a camera device of the wireless device; and
pausing the screen recording session from capturing the digital image content during the screen recording session for the time duration that the device application restricts the screen recording session.

15. A method, comprising:
capturing media content with a screen recording session initiated on a wireless device;
determining that a device application restricts the screen recording session from the capturing the media content on the wireless device;
adding a displayable and user-selectable start delimiter to the screen recording session to indicate a beginning section of the screen recording session being restricted by the device application;
adding a displayable and user-selectable end delimiter to the screen recording session to indicate an end section of the screen recording session being restricted by the device application, the screen recording session continuing for a time duration defined by the start delimiter to the end delimiter.

16. The method of claim 15, wherein the media content captured by the screen recording session is at least one of digital image content displayed on a display screen of the wireless device or audio data processed with an audio module of the wireless device.

17. The method of claim 15, wherein the screen recording session is recorded as blank video data without audio or visual content during the time duration that the device application restricts the screen recording session marked by the start delimiter to the end delimiter.

18. The method of claim 15, further comprising:
determining that the device application is executing on the wireless device as a foreground application, and adding the start delimiter to the screen recording session.

19. The method of claim 15, wherein the determining that the device application restricts the screen recording session is based on the wireless device processing empty video data or empty audio data during the screen recording session.

20. The method of claim 15, further comprising:
determining that the device application is executing on the wireless device as a background application, and adding the end delimiter to the screen recording session.

* * * * *